(12) United States Patent
Horie et al.

(10) Patent No.: US 10,331,554 B2
(45) Date of Patent: *Jun. 25, 2019

(54) BALANCED DOUBLE DEQUES FOR ELIMINATING MEMORY FENCES IN GARBAGE COLLECTION

(71) Applicant: INTERNATIONAL BUSINESS MACHINES CORPORATION, Armonk, NY (US)

(72) Inventors: Michihiro Horie, Tokyo (JP); Hiroshi H. Horii, Tokyo (JP); Tamiya Onodera, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,201

(22) Filed: Apr. 28, 2017

(65) Prior Publication Data
US 2018/0314631 A1  Nov. 1, 2018

(51) Int. Cl.
G06F 9/48 (2006.01)
G06F 12/02 (2006.01)

(52) U.S. Cl.
CPC ........ G06F 12/0253 (2013.01); G06F 9/4843 (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 6,826,583 B1 | 11/2004 | Flood et al. | |
| 7,640,544 B2 | 12/2009 | Flood et al. | |
| 7,870,171 B2* | 1/2011 | Daynes | G06F 12/0276 707/819 |
| 9,038,087 B2 | 5/2015 | Ringseth et al. | |
| 2003/0005025 A1* | 1/2003 | Shavit | G06F 9/4843 718/102 |
| 2004/0088702 A1* | 5/2004 | Garthwaite | G06F 12/0276 718/100 |
| 2012/0191947 A1* | 7/2012 | Horii | G06F 9/52 712/205 |
| 2012/0254267 A1* | 10/2012 | Printezis | G06F 12/0269 707/818 |

OTHER PUBLICATIONS

Danny Hendler, A dynamic-sized nonblocking work stealing deque, Distrib. Comput, Dec. 2005.
Liu Chi, Efficient Work-Stealing with Blocking Deques, 2014 IEEE International Conference on High Performance Computing and Communications (HPCC), 2014 IEEE 6th International Symposium on Cyberspace Safety and Security (CSS) and 2014 IEEE 11th International Conference on Embedded Software, Aug. 2014.

* cited by examiner

*Primary Examiner* — Mano Padmanabhan
*Assistant Examiner* — William E. Baughman
(74) *Attorney, Agent, or Firm* — Tutunjian & Bitetto, P.C.; Vazken Alexanian

(57) ABSTRACT

Garbage collection methods and systems include adding a data object to one of multiple queues owned by a first garbage collection thread. The queues include a public queue and multiple private queues. A task is popped from one of the plurality of queues to perform garbage collection. The public queue is swapped with one of the private plurality of private queues if there are no tasks in the public queue.

10 Claims, 4 Drawing Sheets ively embodiments thereof, which is to be read in connection with the accompanying drawings.

BALANCED DOUBLE DEQUES FOR ELIMINATING MEMORY FENCES IN GARBAGE COLLECTION

BACKGROUND

Technical Field

The present invention generally relates to computer memory management and, more particularly, to garbage collection systems for executable programs.

Description of the Related Art

Some computer programming languages make use of a form of automatic memory management called garbage collection. Garbage collection determines when objects stored in memory are no longer needed by the program and automatically frees that memory for re-use.

In a multi-threaded environment, each thread may have its own associated garbage collection. Each thread may therefore maintain a double-ended queue (hereinafter "deque") to keep track of memory objects that are waiting for garbage collection. To help reduce the overhead involved in garbage collection, a thread may "steal" work from another thread's garbage collection deque if its own deque is empty.

However, managing the interaction between different threads' accesses to the different deques can necessitate the use memory fences before pushing, popping, and stealing tasks. These memory fences can represent a significant burden on computational efficiency as the program waits for certain operations to finish before other operations can proceed.

SUMMARY

A garbage collection method includes adding a data object to one of multiple queues owned by a first garbage collection thread. The queues include a public queue and multiple private queues. A task is popped from one of the plurality of queues to perform garbage collection. The public queue is swapped with one of the private plurality of private queues if there are no tasks in the public queue.

A garbage collection method includes adding a data object to one of a plurality of queues owned by a first garbage collection thread. The plurality of queues includes a public deque and a plurality of private queues. Adding the data object to one of the plurality of queues includes adding the data object to a public queue if there is sufficient space in the public deque and adding the data object to a private queue based on a number of sub-tasks of the data object if there is not sufficient space in the public deque. A task from is popped a first private queue if the first private queue is not empty. A task is popped from the public queue if the first private queue is empty. The public queue is swapped with a second private queue if there are no tasks in the public queue.

A garbage collection system includes a garbage collection module having a processor configured to add a data object to one of multiple queues owned by a first garbage collection thread. The queues includes a public queue and multiple private queues. A task is popped from one of the plurality of queues to perform garbage collection and the public queue is swapped with one of the private plurality of private queues if there are no tasks in the public queue.

These and other features and advantages will become apparent from the following detailed description of illustra-

BRIEF DESCRIPTION OF THE DRAWINGS

The following description will provide details of preferred embodiments with reference to the following figures wherein.

DETAILED DESCRIPTION

Embodiments of the present invention provide garbage collection in multi-threaded systems, where each garbage collector thread has multiple double-ended queues (hereinafter "deques"). Each garbage collector thread has multiple private deques that only it can access and one public deque that is accessible from all other garbage collection threads. Each garbage collector thread uses its own private deques by default. Memory fences are not needed for access to the private deques.

Generally speaking, a "memory fence" or "memory barrier" is an instruction that creates an ordering constraint for memory operations issued before and after the barrier instruction. In other words, all memory operations issued before the memory fence is created are performed before memory operations issued after the memory fence is created. This is useful because some processors may implement performance optimizations that change the order of operations within a thread. Memory fences are used in multi-threading systems to prevent out of order execution where different threads have shared access to particular portions of memory. The memory fences thereby prevent unexpected behavior, but risk resource starvation as threads are forced to wait for the completion of particular operations before continuing their own processing.

Figure 1:
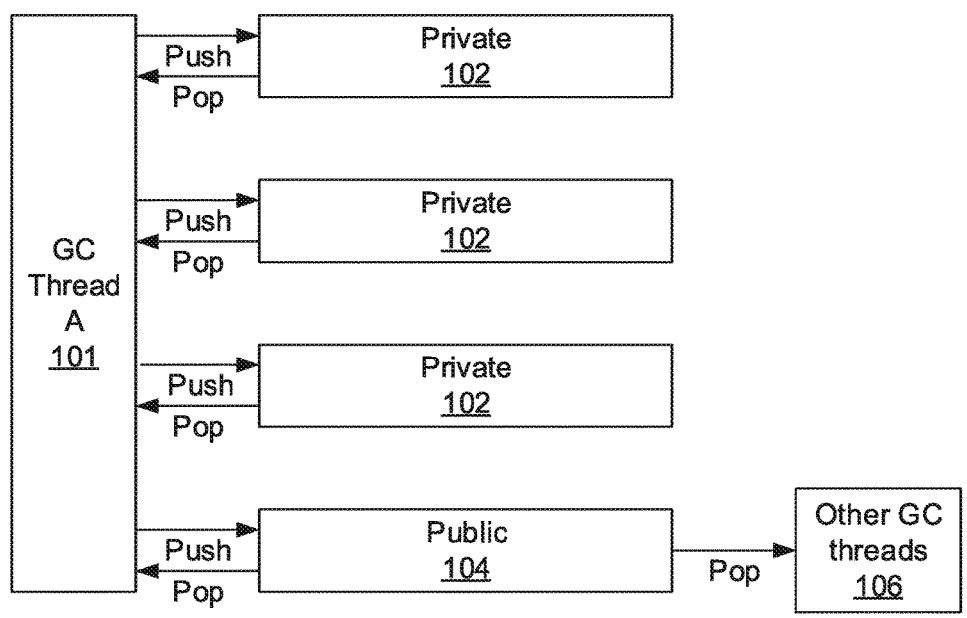
FIG. 1 is a block diagram of the accesses to the garbage collection queues of a single garbage collection thread in accordance with an embodiment of the present invention.

Referring now to FIG. 1, a diagram of a single garbage collection thread is shown. A first garbage collection thread, identified as GC thread A 101 has access to multiple private queues 102 and a single public deque 104. GC thread A 101 can push and pop data objects on its end of any of the private queues 102 and on the public-facing end of public deques 104. Other GC threads 106 have the ability to pop data objects from the public deque 104 only. It should be noted that the private queues 102 can be single-ended queues, as only one thread will be able to access them. The first private queue 102 is used by default, with the other private queues 102 being used if needed.

In general, the size of the public deque 104 may be kept smaller than the private queue(s) 102. At each garbage collection, some percentage of the public deques 104 are randomly chosen and they are shrunk to a percentage of their original size. For example, in one embodiment, 25% of the public deques 104 may be selected to be shrunk to 10% of their original size. "Shrinking" a public deque 104 in this context refers to the transfer of tasks from the public deque 104 to a private queue 102.

Each public deque 104 has an upper limit to its size, which may be configured at the beginning of each garbage collection thread. For each GC thread A 101, several public deques 104 for respective other GC threads 106 are selected and the upper limits of those public deques 104 is reduced.

Only a fraction of the public deques 104 are selected because of the need to maintain load balance by not disturbing the taking of tasks by other GC threads 106. In other words, the total number of tasks that are taken should not be reduced as compared to a single-deque implementation. Selecting all public deques 104 which have reduced upper limits would result in a decrease in the number of tasks taken by other GC threads 106, resulting in a decrease in load balancing.

The public deques 104 are randomly selected because it is difficult to determine which public deques 104 to take tasks from at runtime to maintain total load balancing. For example, while a naïve approach might be to take tasks from the public deque 104 that has the most tasks stored, this may result in many of the other GC threads 106 trying to take a task from the same public deque 104, resulting in contention and a failure by many of the other GC threads to successfully take a task. Scheduling this in advance is also difficult, so random selection provides a compromise.

If a public deque 104 is full, then the GC thread A pushes a task from the public deque 104 to a private queue 102. If the private queues 102 are empty, then the GC thread A pops a task from the public deque 104. In this manner the GC thread A prioritizes filling the public deque 104, so that other GC threads 106 can help with garbage collection if they are able, but prioritizes working on tasks in its own private queue(s) 102.

A task that can produce many sub-tasks may be pushed to the public deque 104. If the public deque 104 is full, then a task already in the public deque 104 may be moved to a private queue 102 and the task with many sub-tasks is pushed to the public deque 104. For example, an array object that has 10,000 elements will create 10,000 sub-tasks during garbage collection. Tasks that can produce many sub-tasks are therefore handled differently by storing such tasks in a separate queue, creating a new private queue 102 to handle the large task.

Tasks that create many sub-tasks can be further categorized, for example from the viewpoint of the number of sub-tasks that each produces. Categorization can be performed based on differences in object types, for example storing tasks for array objects in one private queue 102 and storing tasks for HashMap objects in another private queue 102. As many private queues 102 as are needed may be created, with some embodiments having a fixed number of private queues 102 according to predetermined categories and with other embodiments having a dynamically managed number of private queues 102.

In one example, a virtual machine with a garbage collection thread may have a public deque 104 and three private queues 102. A first private queue 102 may store tasks that produce relatively few sub-tasks (e.g., less than a first threshold), a second private queue 102 may store tasks that produce relatively many sub-tasks (e.g., greater than the first threshold but less than a second threshold), and a third private queue 102 may store tasks that produce a very large number of subtasks (e.g., greater than the second threshold).

When a public deque 104 of GC thread A 101 becomes empty, and if the garbage collection thread has tasks in its private queues 102, then GC thread A 101 moves objects from one or more of its private queues 102 into the public deque 104. Following the above example, the third private queue 102 has priority for this switching, because it is advantageous to share heavy tasks with other CD threads 106. Considering that a GC thread will only look to public deques 104 of other GC threads 106 when its own private queues 102 and public deque 104 are empty, allowing such an idle GC thread to take a task with many sub-tasks will help keep the load balanced.

Figure 2:
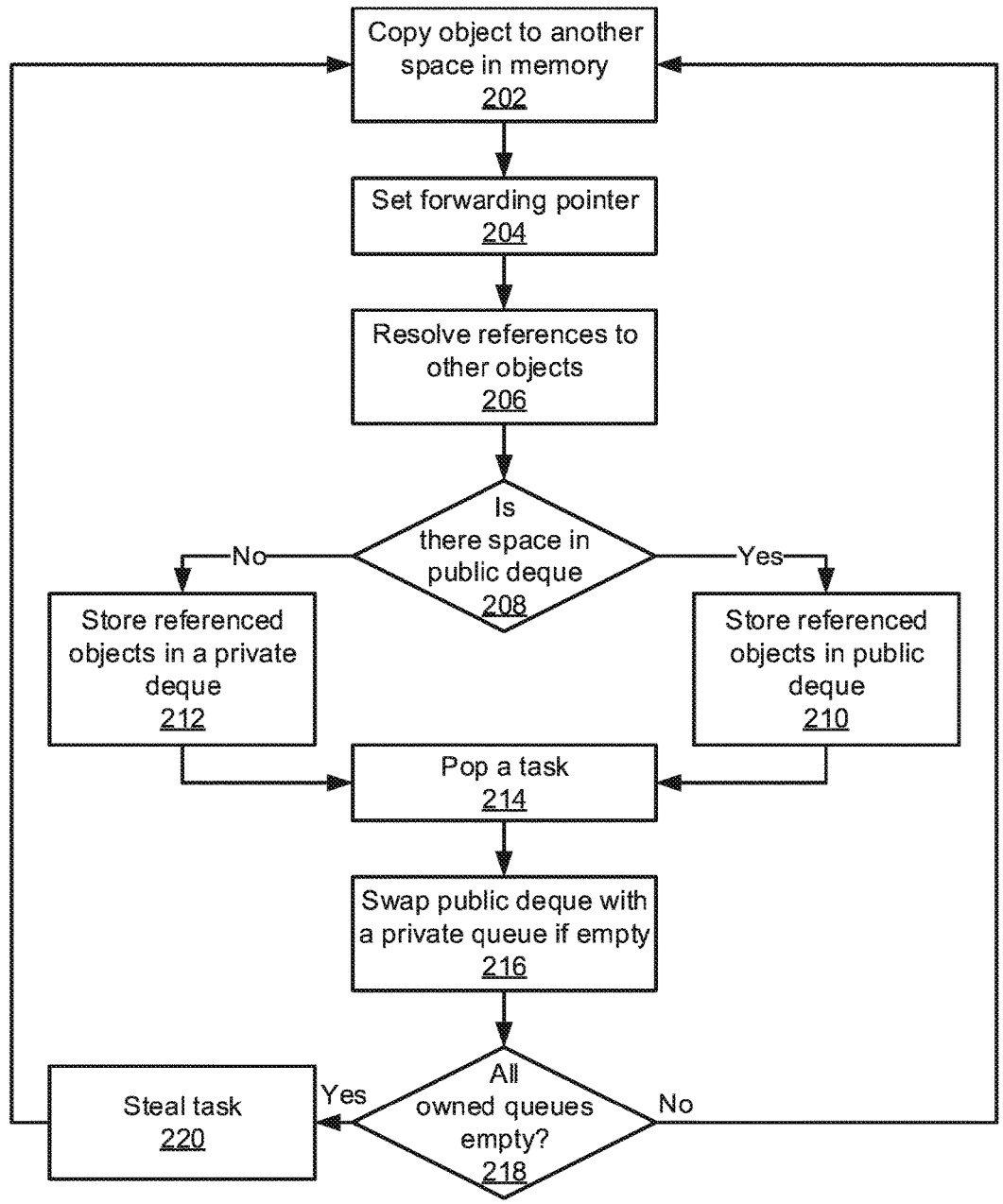
FIG. 2 is a block/flow diagram of a garbage collection process in accordance with an embodiment of the present invention.

Referring now to FIG. 2, a garbage collection method is shown. Block 202 copies an object being garbage collected by GC thread A 101 to another space in heap memory. Block 204 sets a pointer to the newly copied object in the header of the original object to show that the object has already been copied. This pointer is called a forwarding pointer.

Block 206 scans the object to resolve direct references from the object to other objects. If block 208 finds that there is space in the public deque 104, block 210 stores the referenced objects in the public deque 104. If not, block 212 stores the referenced objects in a private queue 102. Following the examples given above, the referenced objects may be stored into a private queue 102 in accordance with the number of sub-tasks each object has. If few sub-tasks are implicated, then the referenced objects may be stored in a first private queue 102, if a moderate number of sub-tasks are implicated, then the referenced objects may be stored in a second private queue 102, and if a large number of sub-tasks are implicated, then the referenced objects may be stored in a third private queue 102.

Block 214 then pops a task from an appropriate queue. Following the above example, block 214 may first attempt to pop tasks from its first private queue 102. If the first private queue 102 is empty, block 214 may next attempt to pop a task from the public deque 104. If the public deque 104 is also empty, then block 214 may attempt to pop a task from the third or the second private queue 102. If the public deque 104 was empty, block 216 swaps the public deque 104 with the third or second private queue 102. This keeps the public deque 104 filled. It should be noted that, if the public deque 104 is swapped with a private queue 102, the swap may be performed before the task is popped in block 214.

Block 218 determines whether all of the queues (including the private queues 102 and the public deque 104) owned by GC thread A 101 are empty. If not, processing returns to block 202. If the queues owned by GC thread A 101 are all empty, block 220 "steals" a task from a public deque 104 that is owned by one of the other GC threads 106. Processing then returns to block 202

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Figure 3:
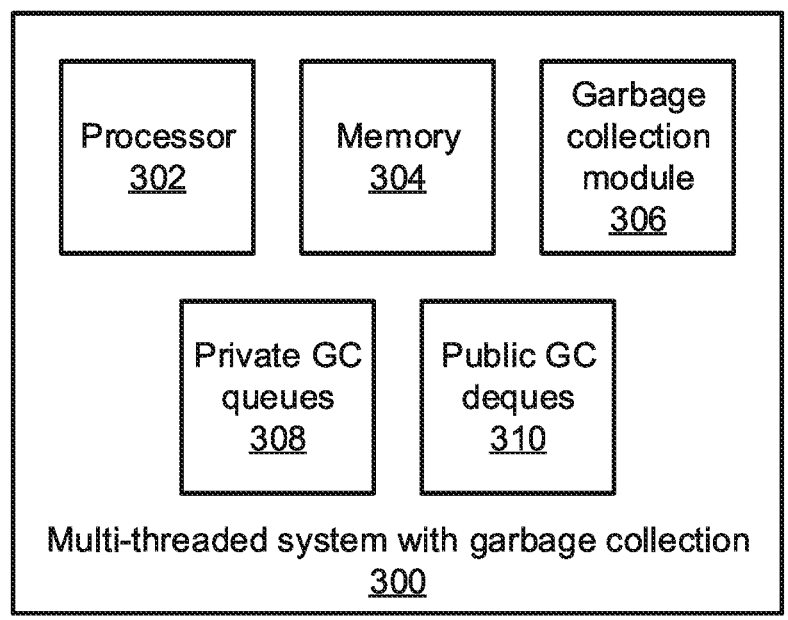
FIG. 3 is a block diagram of a multi-threaded system with garbage collection in accordance with an embodiment of the present invention.

Referring now to FIG. 3, a multi-threaded system 300 with garbage collection is shown. The system 300 includes a hardware processor 302 and memory 304. It should be understood that the hardware processor 302 may represent a single processing element that is configured to execute multiple threads or may, alternatively, represent multiple separate processing elements (e.g., multiple processor cores) that are configured to perform multi-threaded operations together. The memory 304 maintains a shared memory that is accessible to all of the threads. In addition, the system 300 includes one or more functional modules that may, in some embodiments, be implemented as software that is stored in memory 304 and is executed by processor 302. In other embodiments, the functional module(s) may be implemented as one or more discrete hardware components in the form of, e.g., application specific integrated chips or field programmable gate arrays.

A garbage collection module 306 operates to perform garbage collection in programs operated by the processor 302. The garbage collection module 306 itself maintains multiple garbage collection threads. Each garbage collection thread maintains private garbage collection queues 102, with the private queues 102 of each garbage collection thread being stored in memory 304 as private GC queues 308. Each garbage collection thread furthermore maintains a single public garbage collection deque 104, with the public deques 104 of the different garbage collection threads being stored in memory 304 as public GC deques 104. The garbage collection module 306 manages the storage of data objects in the private GC queues 308 and the public GC deques 310

Figure 4:
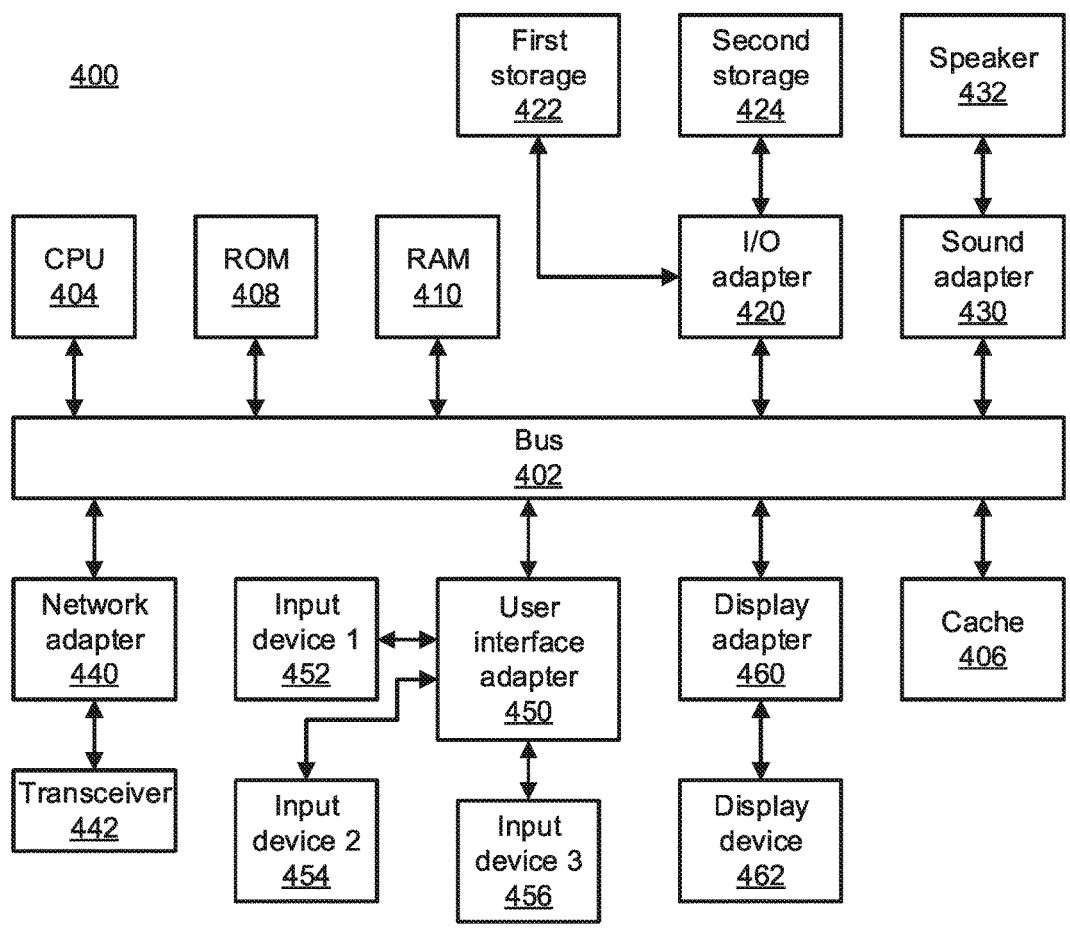
FIG. 4 is a block diagram of a processing system in accordance with an embodiment of the present invention.

Referring now to FIG. 4, an exemplary processing system 400 is shown which may represent the multi-threaded system 300. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A garbage collection system, comprising:
a garbage collection module comprising a processor configured to add a data object to one of a plurality of queues owned by a first garbage collection thread, wherein the plurality of queues includes a public queue and a plurality of private queues, to pop a task from one of the plurality of queues to perform garbage collection, and to swap the public queue with one of the plurality of private queues if there are no tasks in the public queue.

2. The garbage collection system of claim 1, wherein the public queue is a deque that a second garbage collection thread pops tasks from.

3. The garbage collection system of claim 1, wherein the garbage collection module is further configured to add the data object to the public queue if there is sufficient space in the public queue.

4. The garbage collection system of claim 3, wherein the garbage collection module is further configured to add the data object to a private queue if there is not sufficient space in the public queue.

5. The garbage collection system of claim 4, wherein the garbage collection module is further configured to select a private queue from the plurality of private queues for the data object based on a number of sub-tasks of the data object.

6. The garbage collection system of claim 5, wherein the garbage collection module is further configured to add the data object to a first private queue if the number of sub-tasks is below a first threshold, to add the data object to a second private queue if the number of sub-tasks is above the first threshold and below a second threshold, and to add the data object to a third private queue if the number of sub-tasks is above the second threshold.

7. The garbage collection system of claim 4, wherein the garbage collection module is further configured to pop the task from the first private queue if the first private queue is not empty.

8. The garbage collection system of claim 4, wherein the garbage collection module is further configured to pop the task from the public queue if the first private queue is empty and the public queue is not empty.

9. The garbage collection system of claim 4, wherein the garbage collection module is further configured to swap the public queue with the second or third private queue if there are no tasks in the public queue.

10. A garbage collection system, comprising:
- a garbage collection module comprising a processor configured to add a data object to one of a plurality of queues, including a public queue and a plurality of private queues, owned by a first garbage collection thread by adding the data object to a first private queue if a number of sub-tasks of the data object is below a first threshold, adding the data object to a second private queue if the number of sub-tasks is above the first threshold, and below a second threshold, and adding the data object to a third private queue if the number of sub-tasks is above the second threshold, and further configured to pop a task from one of the plurality of queues to perform garbage collection and to swap the public queue with one of the private plurality of private queues if there are no tasks in the public queue.

* * * * *